(12) United States Patent
Lutke et al.

(10) Patent No.: US 7,966,872 B2
(45) Date of Patent: Jun. 28, 2011

(54) IN-FLIGHT TESTING KITS AND METHODS FOR EVALUATING PROPOSED AERODYNAMIC STRUCTURES FOR AIRCRAFT

(75) Inventors: Kevin R. Lutke, Huntington Beach, CA (US); Blaine K. Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 392 days.

(21) Appl. No.: 12/178,486

(22) Filed: Jul. 23, 2008

(65) Prior Publication Data

US 2010/0018301 A1 Jan. 28, 2010

(51) Int. Cl.
*G01M 9/06* (2006.01)
(52) U.S. Cl. ...................... 73/118.03; 73/147
(58) Field of Classification Search ............... 73/112.01, 73/118.03, 147
See application file for complete search history.

(56) References Cited

U.S. PATENT DOCUMENTS

| | | | |
|---|---|---|---|
| 1,272,712 A | 7/1918 | Recuero | |
| 2,009,296 A | 7/1935 | Mayo | |
| 2,062,599 A | 12/1936 | North | |
| 2,308,764 A | 1/1943 | Makaroff | |
| 2,863,618 A | 12/1958 | Doyle et al. | |
| 2,936,966 A | 5/1960 | Vogt | |
| 2,998,208 A | 8/1961 | Di Perna | |
| 3,003,717 A | 10/1961 | Booker | |
| 3,006,576 A | 10/1961 | Elijah | |
| 3,070,326 A | 12/1962 | Griffith | |
| 3,516,624 A | 6/1970 | Crook | |
| 3,651,583 A | 3/1972 | Clark et al. | |
| 4,204,154 A * | 5/1980 | Frosch et al. | 324/538 |
| 4,417,708 A * | 11/1983 | Negri | 244/45 R |
| D291,555 S | 8/1987 | Rosenthal | |
| 5,000,398 A | 3/1991 | Rashev | |
| 5,077,671 A * | 12/1991 | Leslie et al. | 701/3 |
| 5,155,482 A * | 10/1992 | Wynn | 340/945 |
| 5,240,207 A | 8/1993 | Eiband et al. | |
| 5,255,873 A | 10/1993 | Nelson | |
| 5,260,874 A * | 11/1993 | Berner et al. | 701/33 |
| 5,390,543 A * | 2/1995 | Staple et al. | 73/583 |
| 5,396,791 A * | 3/1995 | Mollmann et al. | 73/116.03 |
| 5,465,923 A | 11/1995 | Milner | |
| 5,521,817 A | 5/1996 | Burdoin et al. | |
| 5,852,237 A * | 12/1998 | Renshaw | 73/180 |
| 5,938,401 A * | 8/1999 | Modeen et al. | 415/36 |
| 6,293,487 B1 | 9/2001 | Gaite | |
| 6,349,601 B1 * | 2/2002 | Losee | 73/714 |
| 6,641,082 B2 | 11/2003 | Bevilaqua et al. | |
| 6,782,317 B2 * | 8/2004 | Mitchell et al. | 701/100 |

* cited by examiner

*Primary Examiner* — Eric S McCall
(74) *Attorney, Agent, or Firm* — Armstrong Teasdale LLP

(57) ABSTRACT

In-flight testing methods and kits for in-flight testing of proposed aerodynamic structures are disclosed. The methods and kits involve a testing station carried on a pre-existing fully engineered and tested host aircraft. Interchangeable but differently configured aerodynamic structures may be carried upon the host aircraft, and existing systems of the host aircraft may be utilized to conduct the testing, avoiding time and cost associated with constructing fully operational demonstrator aircraft for testing purposes.

18 Claims, 15 Drawing Sheets

IN-FLIGHT TESTING KITS AND METHODS FOR EVALUATING PROPOSED AERODYNAMIC STRUCTURES FOR AIRCRAFT

BACKGROUND OF THE DISCLOSURE

The field of the disclosure relates generally to testing systems and methods for in-flight evaluation of proposed designs of aerodynamic components and systems for an aircraft, and more particularly to in-flight testing kits, systems, and methods for evaluating aircraft wingsets having integrated radar systems.

The design process for new aircraft, or its components and systems, is an intensive one. Conventionally, after much design work and analysis is undertaken to arrive at a feasible design, the design is tested and refined using full prototype, but experimental, constructions of the aircraft, sometimes referred to as a demonstrator aircraft. The experimental prototype demonstrators are flown and the performance of its associated components and systems are evaluated under in-flight operating conditions. While such testing can indeed be effective, it is a long and expensive process, sometimes requiring the construction of more than one prototype or demonstrator aircraft. Lower cost testing of aircraft components and systems in a shorter time frame would be desirable.

BRIEF DESCRIPTION OF THE DISCLOSURE

In one aspect, a method of testing an aerodynamic structure is disclosed. The method comprises: providing a pre-existing, fully engineered and tested aircraft having a test station including an attachment interface integrated into the fuselage of the aircraft; providing a first test element; attaching the first test element to the attachment interface; flying the pre-existing, fully engineered aircraft with the first test element attached; and obtaining in-flight testing data for the first test element.

Optionally, providing the first test element may comprise providing an aircraft structure devoid of a propulsion system and an electrical power system. Fully engineered systems of the pre-existing aircraft may be utilized to obtain the in-flight testing data. The method may comprise, for example, connecting the electrical power system of the pre-existing, fully engineered and tested aircraft to the first test element. Providing a pre-existing, fully engineered and tested aircraft may include providing a Boeing E-3 Sentry Airborne Early Warning And Control (AWACS) aircraft, and the method may include modifying the AWACS aircraft to carry the first test element.

The method may also comprise: landing the pre-existing, fully engineered aircraft; removing the first test element from the attachment interface; attaching a second test element to the attachment interface, the second test element being different from the first; flying the pre-existing, fully engineered aircraft with the second test element attached; and obtaining in-flight testing data for the second test element.

Attaching a first test element may comprise attaching a proposed wingset planform to the attachment interface. The first test element may comprise a wingset platform having a conformal radar array integrated on an outer surface of a structural skin, and the method may further include obtaining in-flight testing data regarding the performance of the conformal radar array.

The method may also optionally comprise changing at least one of an angle of incidence, a roll angle, or a yaw angle of the test element relative to a respective fixed reference line or plane associated with the pre-existing, fully engineered aircraft. Changing the angle of incidence may comprise changing the angle of incidence while the pre-existing fully, engineered aircraft is in flight.

In another aspect, a method of reconfiguring a fully engineered and tested aircraft to conduct testing of a proposed aircraft structure design is disclosed. The method comprises: obtaining a fully engineered and tested aircraft having a fuselage, an adaptable interface integrated with the fuselage, and with a secondary structure attached to adaptable interface; removing the secondary structure from the adaptable interface; and modifying the adaptable interface to receive the proposed aircraft structure design for testing purposes. Obtaining the fully engineered and tested aircraft may comprise obtaining a Boeing E-3 Sentry Airborne Early Warning And Control (AWACS) aircraft.

The method of reconfiguring the aircraft may also include attaching the proposed aircraft structure design to the adaptable interface. The fully engineered and tested aircraft may include an electrical power system and the proposed aircraft structure design may include electrical components, with the method further comprising connecting the electrical components to the electrical power system. Modifying the adaptable interface may comprise configuring the interface so that an angle of incidence of the proposed aircraft structure design relative to the fuselage is adjustable. The proposed aircraft structure design may be a wingset platform including a conformal radar sensor array.

In still another aspect, an aircraft design testing kit is disclosed. The kit comprises: a fully engineered and tested aircraft having a fuselage and a test station interface on the fuselage or elsewhere; and a plurality of differently configured but interchangeable wingset planforms each mountable to the test station interface, wherein each of the plurality of wingset planforms may be flight tested while mounted to the test station interface.

Optionally, the plurality of wingset planforms are provided with conformal radar sensor arrays. The fully engineered and tested aircraft may be a modified Boeing E-3 Sentry Airborne Early Warning And Control (AWACS) aircraft.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION

Figure 1:
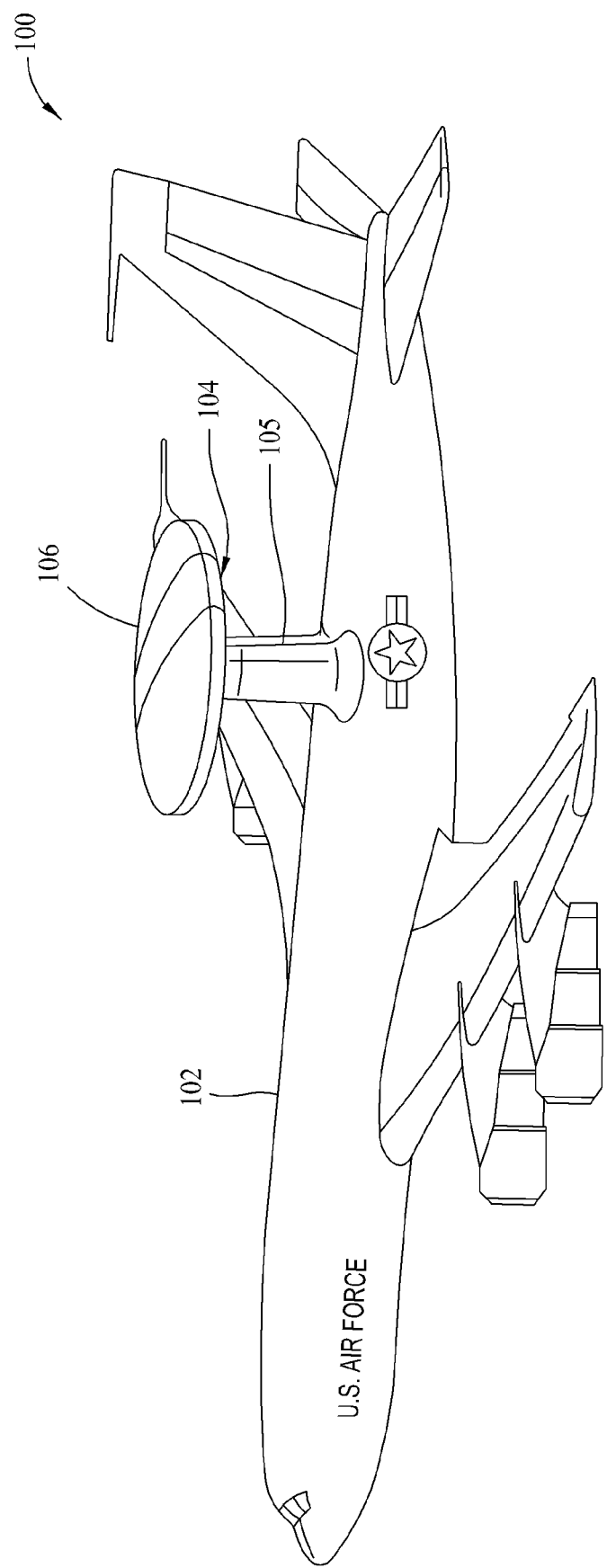
FIG. 1 is a perspective view of an exemplary fully tested and engineered aircraft.
Figure 2:
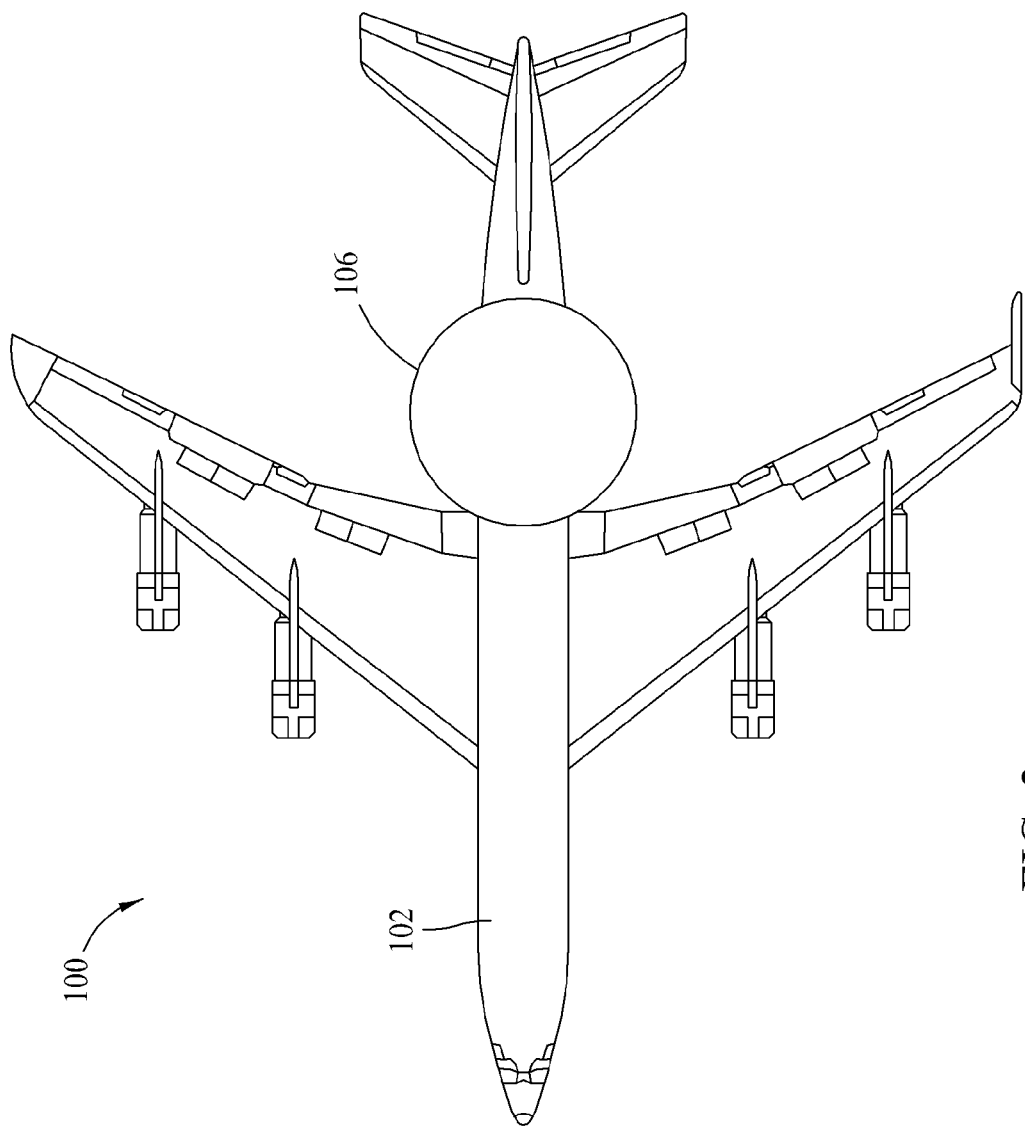
FIG. 2 is a top view of the aircraft shown in FIG. 1.
Figure 3:
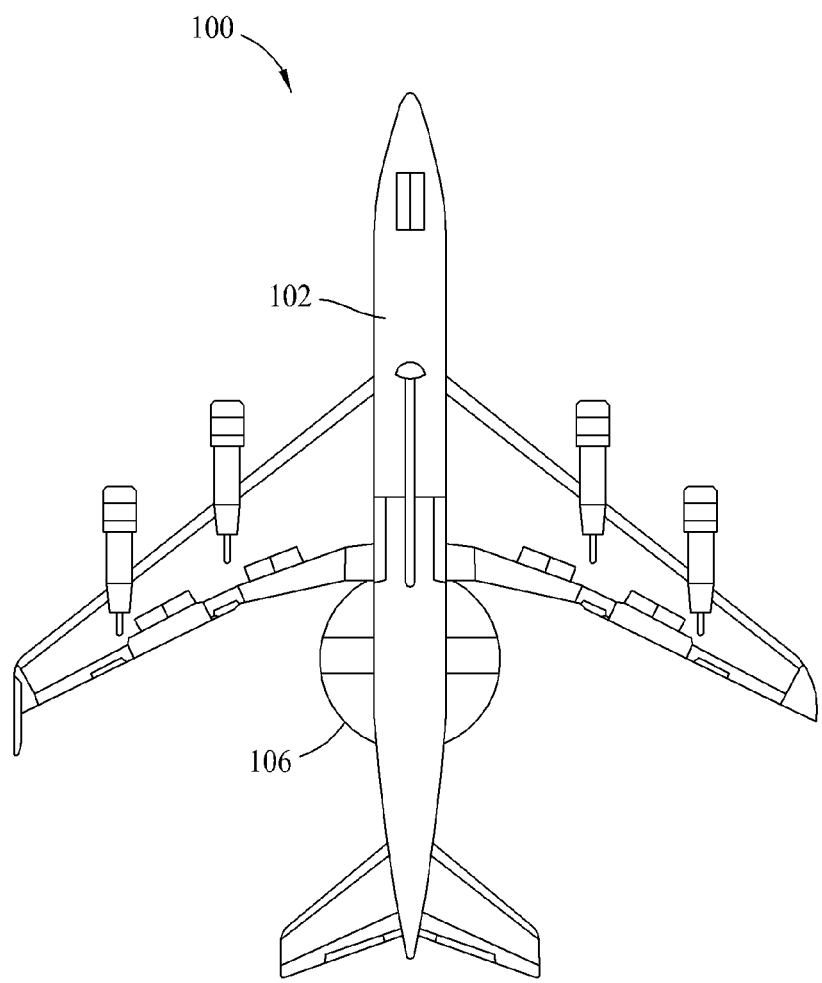
FIG. 3 is a bottom view of the aircraft shown in FIG. 1.
Figure 4:
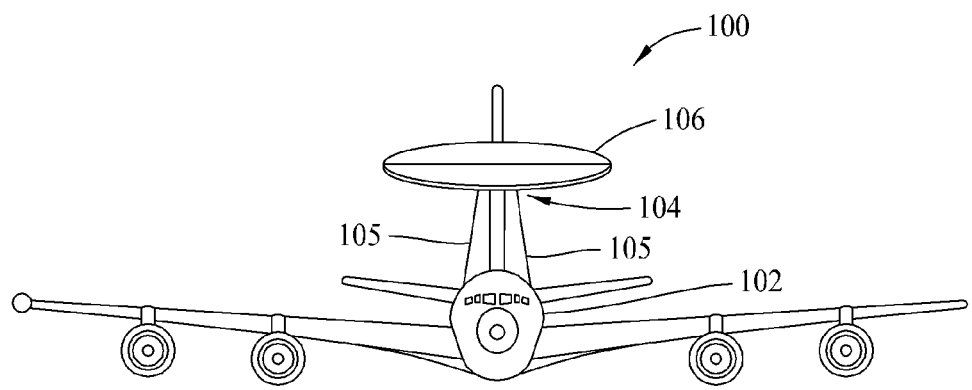
FIG. 4 is a front view of the aircraft shown in FIG. 1.
Figure 5:
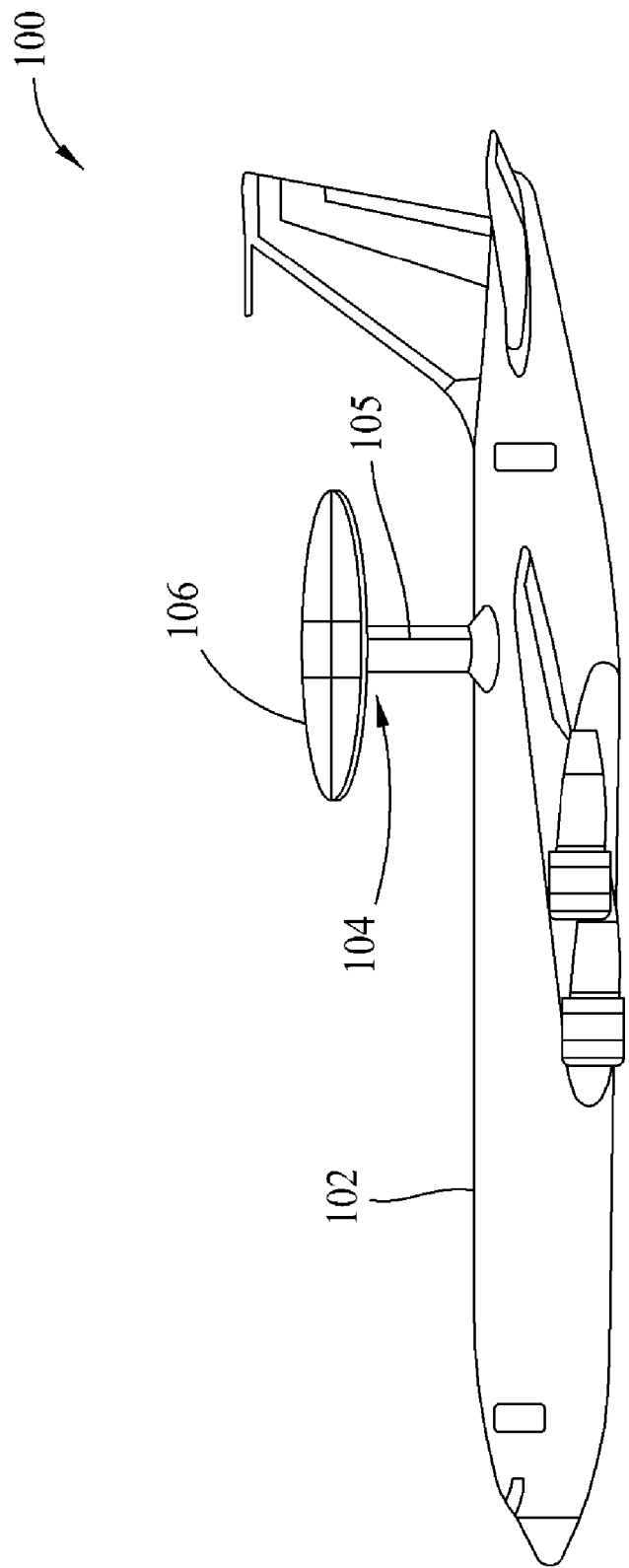
FIG. 5 is a side view of the aircraft shown in FIG. 1.
Figure 6:
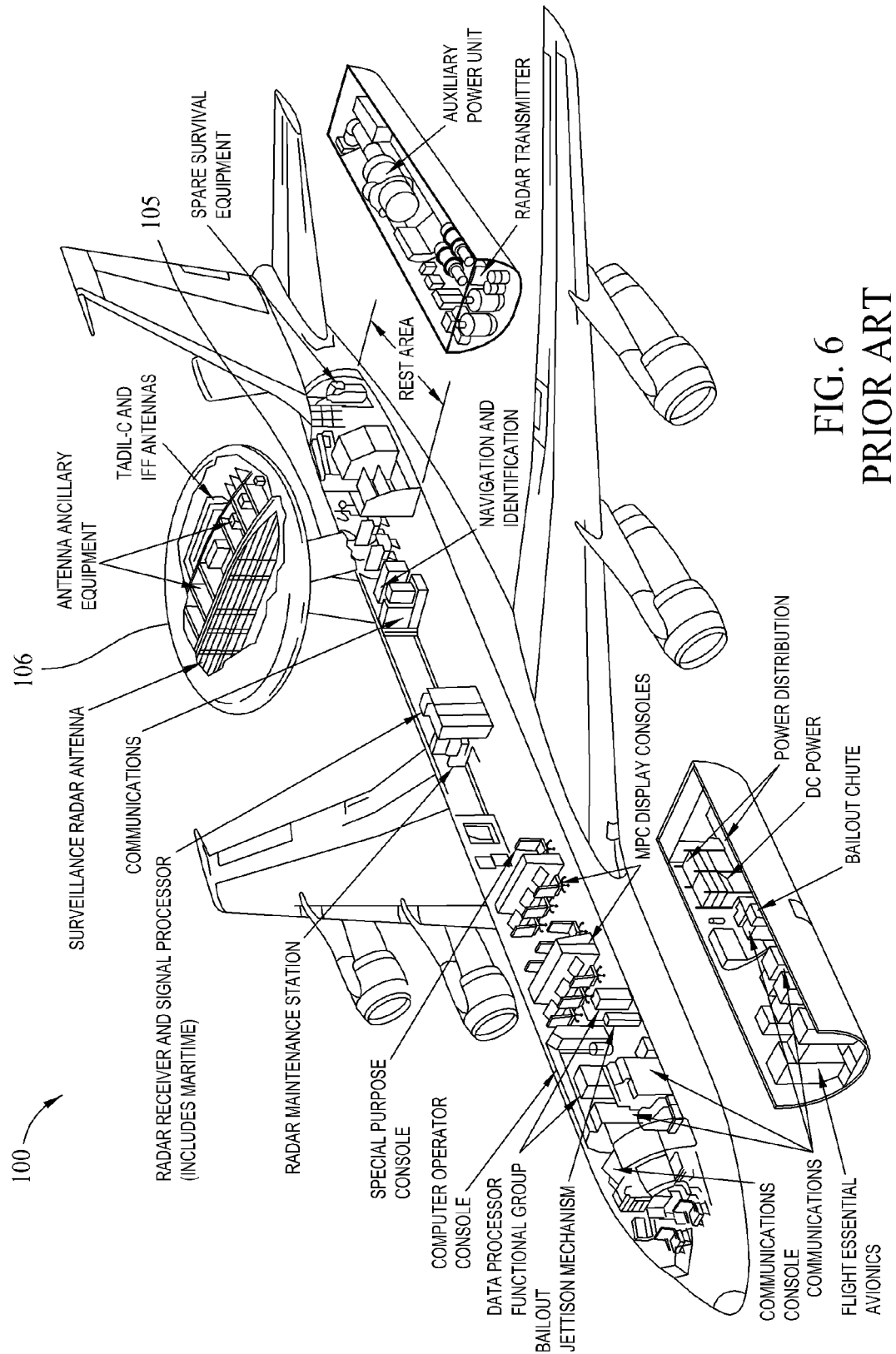
FIG. 6 is a partial exploded view of the aircraft shown in FIG. 1.

Exemplary embodiments of aircraft testing systems and methods are disclosed below that provide for much shorter timeframes to complete the testing and with much less cost than conventional testing methods. These advantages are obtained at least in part with a testing station carried on a existing, fully designed and tested aircraft, allowing aircraft systems to be completely tested under in-flight operating conditions without having to manufacture a complete experimental prototype aircraft to conduct the requisite in-flight testing.

In order to appreciate the invention to its fullest extent, the following disclosure will be segmented into different parts: wherein Part I discusses the state of the art; and Part II discloses novel and advantageous aircraft testing kits, systems and methods.

I. Introduction to the Invention

The design and testing of new aircraft systems and components is both time and labor intensive. With the rapidly advancing technological developments in the aircraft industry, the demand for newer and more advanced aircraft features is increasing. With an increasing sophistication of technology being utilized, however, newly designed aircraft, as well as newly designed components and systems for existing aircraft, are subject to intensive testing and optimization efforts.

As one example, but far from being the only example, advanced radar systems incorporating advanced sensors and conformal phased sensor arrays are now being proposed for certain types of aircraft. Such sensor arrays are proposed to be conformal radar arrays structurally integrated into the skin structure at the leading and trailing edges among other locations, on the wings of the aircraft, providing a 360 degree view of a battlespace to monitor ground and air forces. Since integrating the radars into the aircraft skin structure in this way is new to the industry, testing the performance of these structurally integrated phased array radars requires their operation in an operationally representative environment, including actual flight testing. Certain technologies including but not limited to radar systems do not scale well, and are difficult to test in a wind tunnel at a reduced scale, as is common practice. For flight testing to be valid, the tests must necessarily be performed with wingset planforms that represent the potential aircraft(s) utilizing the conformal sensor arrays. When several different aircraft candidate configurations with very different wingset planforms are being considered, conventional testing techniques would require several different prototype demonstrator aircraft to be constructed for flight testing purposes. The cost of doing so, however, may be prohibitive as a practical matter.

To reduce costs of fabricating multiple prototype aircraft having different wingset planforms for flight testing purposes, it has been proposed to provide a common fuselage with attach points for interchangeable, but different wingset planforms so that different configurations of wingsets can be attached for testing purposes. The common fuselage would house propulsion, landing gear, communication, electrical power and other aircraft subsystems. This would allow flight testing of several different wingset planforms with one demonstrator aircraft. Building a common fuselage that may be reconfigured with different wingset planforms, however, would itself be an expensive proposition, and presents unique engineering challenges.

For example, the fuselage design would likely need to be highly optimized, and be fabricated from advanced materials to ensure valid test results for different wingset planforms having the proposed conformal radar systems. It would be very difficult to design a common fuselage that can accommodate wingsets having different geometry and configuration, which conformal radar testing would entail. This would be even more so when multiple and different aircraft manufacturer entities are involved, as is often the case for military aircraft, with each of the entities developing different and alternative wingset structures and radar systems that are to be evaluated in flight. Additionally, the points at which different wings would attach to the fuselage, and the size of the wings in relation to the fuselage, may be substantially different for different wingset configurations of interest. Different wingsets also change the aircraft's center of gravity and aerodynamic center, creating cascading issues for the design and configuration of a demonstrator aircraft.

As another example, redundant or parasitic structure would likely need to be designed into the common fuselage to accommodate different load paths associated with different wingset planforms having the conformal radar skins. Engineering and manufacturing costs of the common fuselage would accordingly be increased.

A propulsion system would also need to be developed for the common fuselage, and this is no simple task. The use of an existing engine is typical for a demonstrator aircraft, but an inlet and a nozzle would need to be designed, built, and tested for the demonstrator fuselage.

Another issue would be the development of appropriate flight control systems for the common fuselage that could adapt to different wingset planforms having different control surfaces and responses in flight. Development of flight control systems is itself complicated, and typically requires computational fluid dynamics (CFD) modeling, wind tunnel testing, simulation, and envelope expansion during flight testing. Many modern aircraft have relaxed or negative stability, requiring expensive digital flight control software that would have to be rewritten for each proposed wingset platform.

The concept of a common fuselage for different wingset planforms also presents landing gear issues. While the use of a pre-existing landing gear is not uncommon in experimental aircraft, their integration is a challenge from a configuration standpoint. Specifically, the location of the landing gear is dictated by center of gravity, tip-back angle and tip-over angle, which may change with the different wingsets to be used with the fuselage.

Crew considerations also complicate the development of a common fuselage with interchangeable wingsets. An unmanned demonstrator fuselage would require development of a ground station and would be heavily dependent on test range facility and bandwidth availability, as well as demonstrate an appropriate level of range safety. The design of a manned demonstrator fuselage would need to accommodate human factors, including, but not limited to, pilot vision factors, that could further complicate the design and/or affect the test results.

All of the above factors present uncertainty in the areas of cost, schedule, and performance for a modular demonstrator fuselage that would be operable with different wingset planforms. A more efficient and less problematic solution for testing new aircraft components and systems such as conformal radar arrays integrated into an aircraft skin structure would be desirable.

II. Exemplary Testing Stations and Methods Utilizing a Pre-Existing Fully Designed and Tested Host Aircraft.

Exemplary embodiments of aircraft component and system testing stations carried onboard a fully designed and tested, pre-existing aircraft, referred to herein as a host aircraft, are disclosed. The testing stations facilitate in-flight testing of proposed aircraft components and systems to be undertaken using fully engineered systems of the host aircraft. The use of a pre-existing host aircraft dramatically accelerates in-flight testing procedures, while providing significant cost savings over conventional method test methods involving prototyped, experimental aircraft for flight testing purposes, and also while avoiding the engineering challenges and issues associated with developing a common fuselage for use with interchangeable aircraft components and systems, such as wingset planforms having conformal radar arrays.

Referring now to FIGS. 1-6, an exemplary known aircraft 100 is shown that is modifiable or reconfigurable for use as a host aircraft for testing purposes. In the embodiment depicted, the aircraft 100 includes a fuselage 102, an adaptable interface 104 including support masts 105 integrated into the design of the fuselage 102, and a secondary structure 106 attached to the interface 104 at a location spaced from the fuselage 102. The secondary structure 106 in one embodiment is an airborne radar rotodome, and the aircraft 100 may be recognized by those in the aircraft industry as a Boeing E-3 Sentry Airborne Early Warning And Control (AWACS) aircraft. Engineering, testing and evaluation of the E-3 Sentry began in 1975 and was completed in 1977 when the first E-3 Sentry was delivered to the U.S. military. Since then, sixty eight E-3 Sentry's have been built, most of which remain in service to this day around the world.

The construction and capabilities of the E-3 Sentry, including the rotodome and its radar capabilities, are relatively well known and documented, and in most aspects are beyond the scope of the present disclosure. Some of the aircraft's features are designated in FIG. 6 as a partial demonstration of the aircraft and its systems. As those in the art may appreciate, the rotodome is essentially a line replaceable unit-because it rotates via electrical/data connections that are established through known slip ring connections in the interface 104.

The E-3 Sentry at one time was itself the subject of intensive design, testing and optimization efforts, but now is a fully engineered, completely tested, and fully functional aircraft. That is, the aircraft 100 has, among other things, a fully developed fuselage, wing structure, propulsion system, flight controls, electrical power system, communication system, signal processing systems, and landing gear system. Also, crew considerations and issues have been completely evaluated and addressed in the design of the aircraft 100. The aircraft 100 has proven to be a reliable performer in the field.

With some modification, the aircraft 100 may advantageously serve as a host aircraft for in-flight testing of proposed aerodynamic components that, unlike the aircraft 100, remain in the engineering design and testing process. As such, the aircraft 100, and all its engineering design and testing processes, are completed at a point in time before the proposed design of an aerodynamic structure for a new aircraft or aircraft system enters the testing phase. The aircraft 100 is therefore sometimes referred to as a "pre-existing" aircraft 100 that has been fully engineered, tested and optimized, yet is capable of serving as a host aircraft for in-flight testing of other aerodynamic structures for which design and testing efforts have not been completed. One such aerodynamic structure presently being proposed for engineering and design includes a wingset platform having a conformal radar array integrated into the structural skin of the wings. Multiple wingset planforms having conformal radar systems are presently contemplated having different sizes, shapes, profiles and configurations, each of which may be tested in flight using the aircraft 100 as explained below, without having to construct a prototype demonstrator aircraft for each wingset platform, and also while avoiding the engineering challenges of designing an operational fuselage that may be commonly used with different but interchangeable wingsets.

Figure 7:
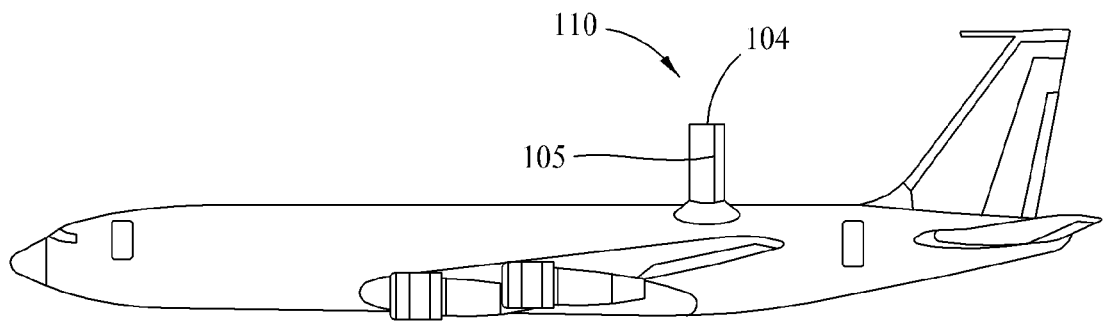
FIG. 7 is a side view of a modification of the aircraft shown in FIGS. 1-6 for use as an in-flight test station for a proposed aircraft system design.
Figure 8:
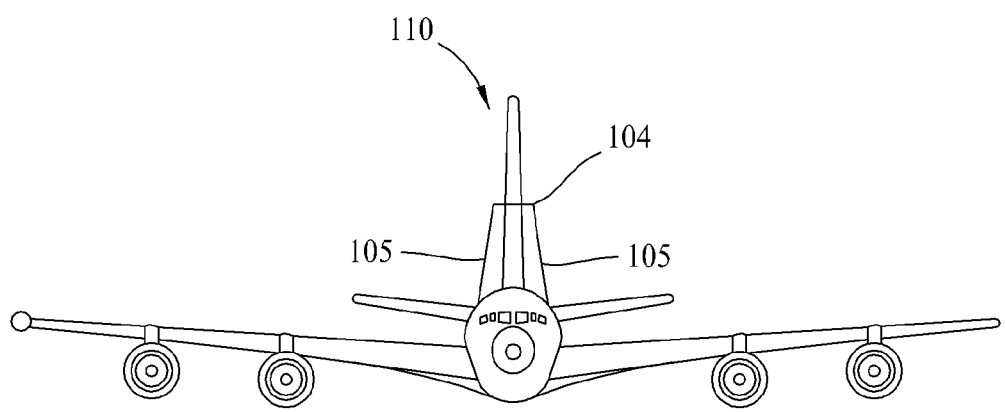
FIG. 8 is a front view of the aircraft shown in FIG. 7.

Referring now to FIGS. 7 and 8, the aircraft 100 is shown with the secondary structure 106, namely the rotodome, removed from the interface 104 and the support masts 105. As such, the interface 104 and the support masts 105, instead of interfacing with and supporting the rotodome, may serve as an in-flight test station 110 whereupon other aerodynamic structures may be mounted, mechanically and electrically, for in-flight testing purposes. Once the dorsally mounted rotodome is removed from the masts 105, the masts 105 may facilitate, with appropriate modification to remove components that are unique to the rotodome application, the mounting of various wingset planforms with structurally integrated conformal radar arrays. Because the masts 105 and interface 104 are themselves designed to support a relatively large rotodome, the masts 105 and interface 104 may capably support relatively large components, such as wingset planforms.

Multiple and different wingset planforms can be provided as a kit with the aircraft 100, with each of the wingset planforms being interchangeably used on the interface 104 and the masts 105. The location of the interface 104 and masts 105 provide a good field of view for radar testing of proposed wingset planforms. Interchangeability of the wingset planforms is facilitated since the masts 105 of the E-3 Sentry, for example, are already equipped with slip ring connections for establishing electrical connections between the systems of the host aircraft 100 and the wingset planforms. While the slip ring connections of the E-3 Sentry were originally provided to establish electrical communication between the radar electronics in the rotodome and related systems in the aircraft fuselage, the communication channels provided by the slip ring connections may be beneficially utilized to connect, for example, radar sensor arrays and other electronics integrated into the wingset planforms to be powered by and communicate with existing systems of the host aircraft 100. The E-3 Sentry, for example, beneficially provides excess electrical power and environmental control capability for the purpose of supporting radars, computers and other sensors. While existing slip ring electrical connections may be beneficially used in an exemplary embodiment, it is contemplated that electrical connections may alternatively be established using, for example, hard-wired connection, wireless data links, or other techniques known in the art.

The use of the host aircraft 100 allows multiple and different experimental pieces that are relatively large, (e.g., wingset planforms with integrated radar arrays) to be changed out in a relatively short amount of time, offering significant time savings in the testing process that would otherwise involve the construction of new aircraft, as well as significant costs savings by avoiding the need to design and construct prototype demonstrator aircraft.

In illustrative embodiments, by utilizing the test station 110 carried by the host aircraft 100 that is larger than the proposed wingset platform designs of interest, wingset planforms may be carried aloft the host aircraft 100 for real-time in-flight testing conditions. The host aircraft 100 may provide necessary aircraft subsystems such as propulsion, landing gear, and communication systems as well as provide electrical power and other amenities needed to conduct in-flight tests of conformal radar skins, for example. That is, demonstrator wingset planforms may be utilized that are devoid of propulsion systems and electrical power systems, among other things, yet may nonetheless be fully tested in flight using the existing systems of the aircraft 100.

While the Boeing E-3 Sentry Airborne Early Warning And Control (AWACS) aircraft 100 depicted is particularly suited for such in-flight testing of proposed wingset planforms, it is contemplated that other existing aircraft having integrated support structures, and associated and mechanical and electrical interfaces, may likewise utilized in other embodiments. Additionally, it is contemplated that existing aircraft (e.g., a Boeing 707 airliner), originally not having such integrated support structure, could be modified and reconfigured to include appropriate integrated support structures, as well as mechanical and electrical interfaces, to perform the testing as described.

Figure 9:
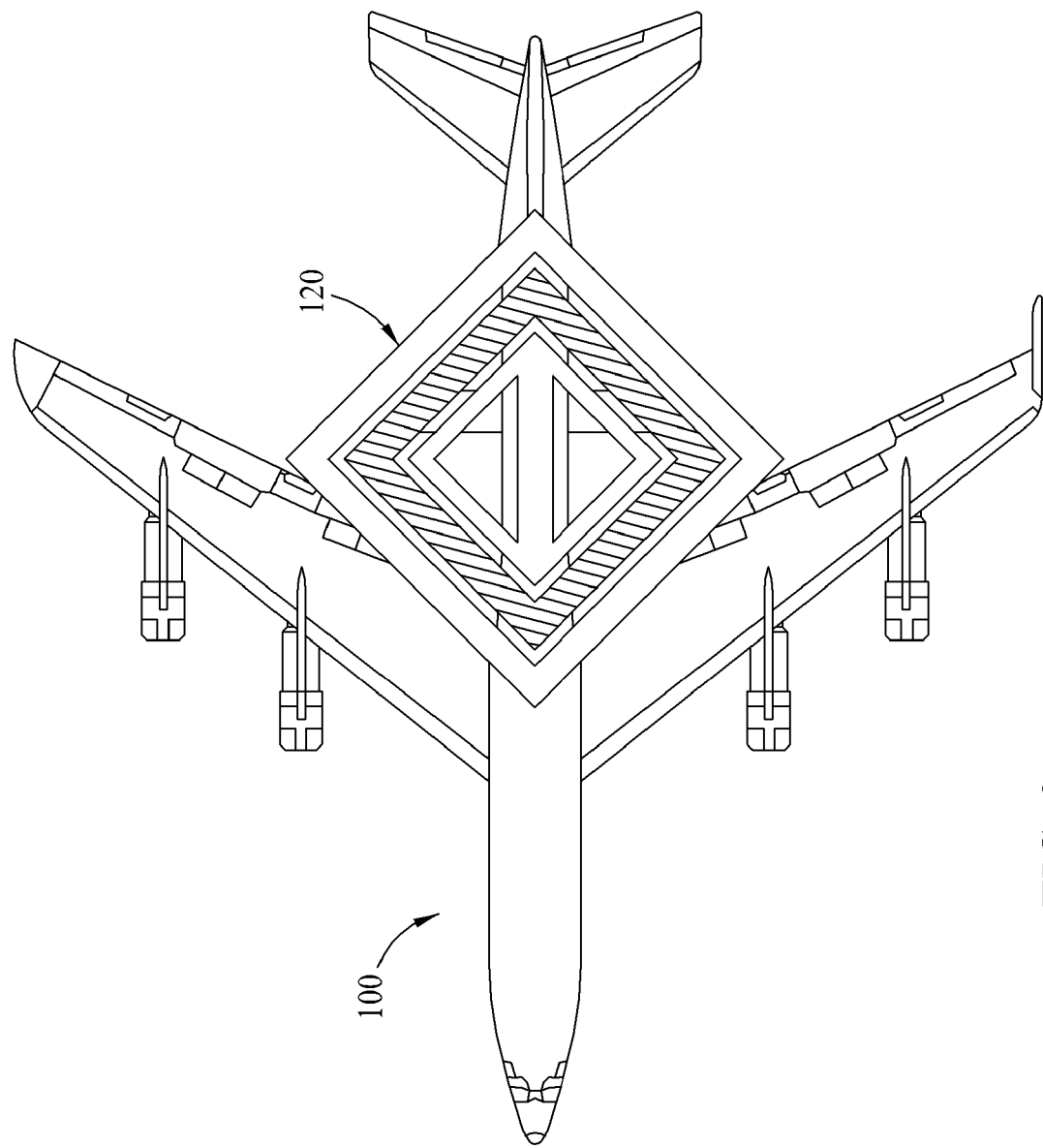
FIG. 9 is a schematic top view of the modified aircraft shown in FIGS. 7 and 8, illustrated with multiple, overlaid test elements of varying scale of a joined wing configuration mounted to the test station.
Figure 10:
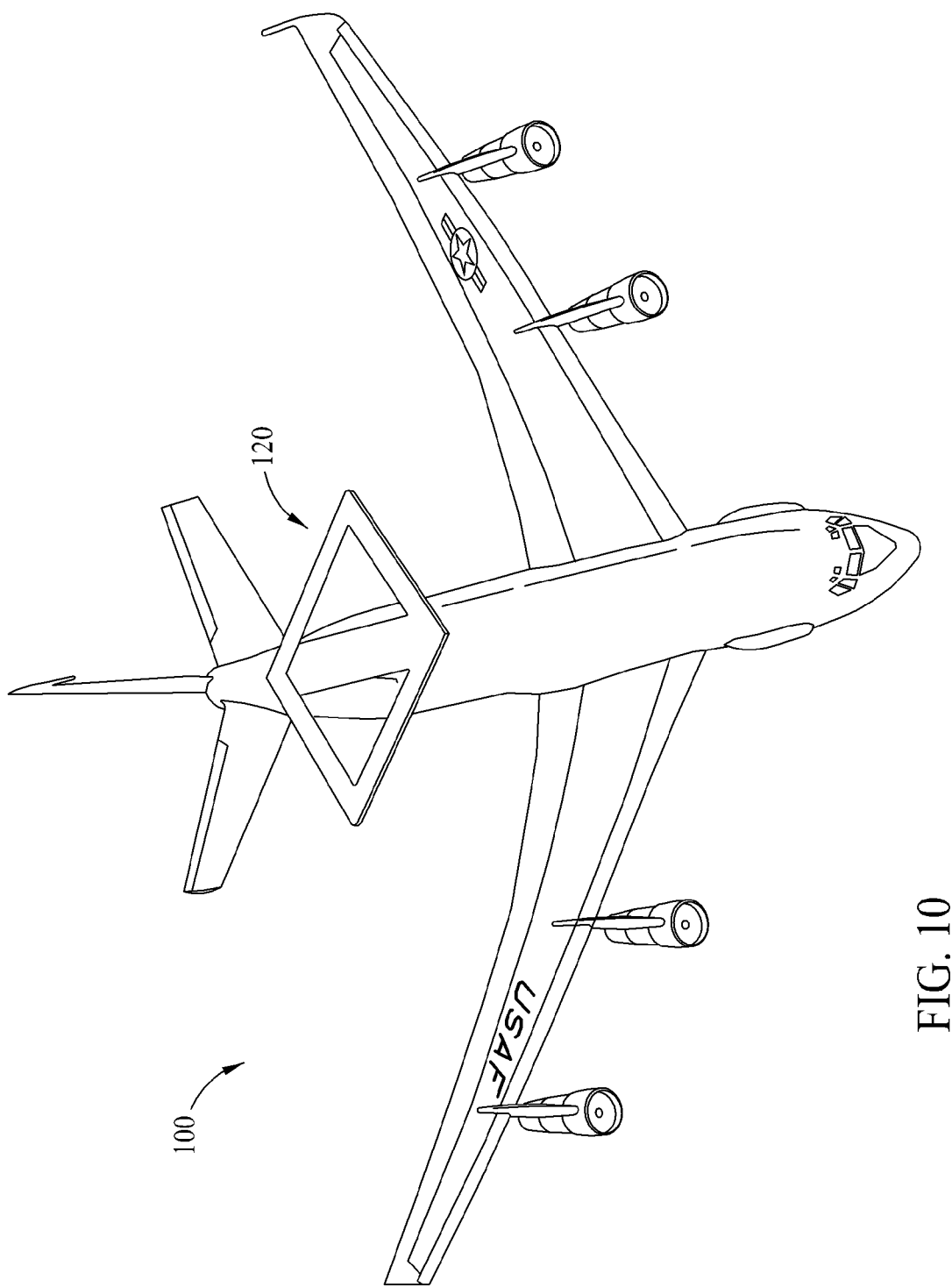
FIG. 10 is a perspective view of the aircraft and test element shown in FIG. 9 illustrating one of the joined wing configurations shown in FIG. 9 coupled to the aircraft.
Figure 11:
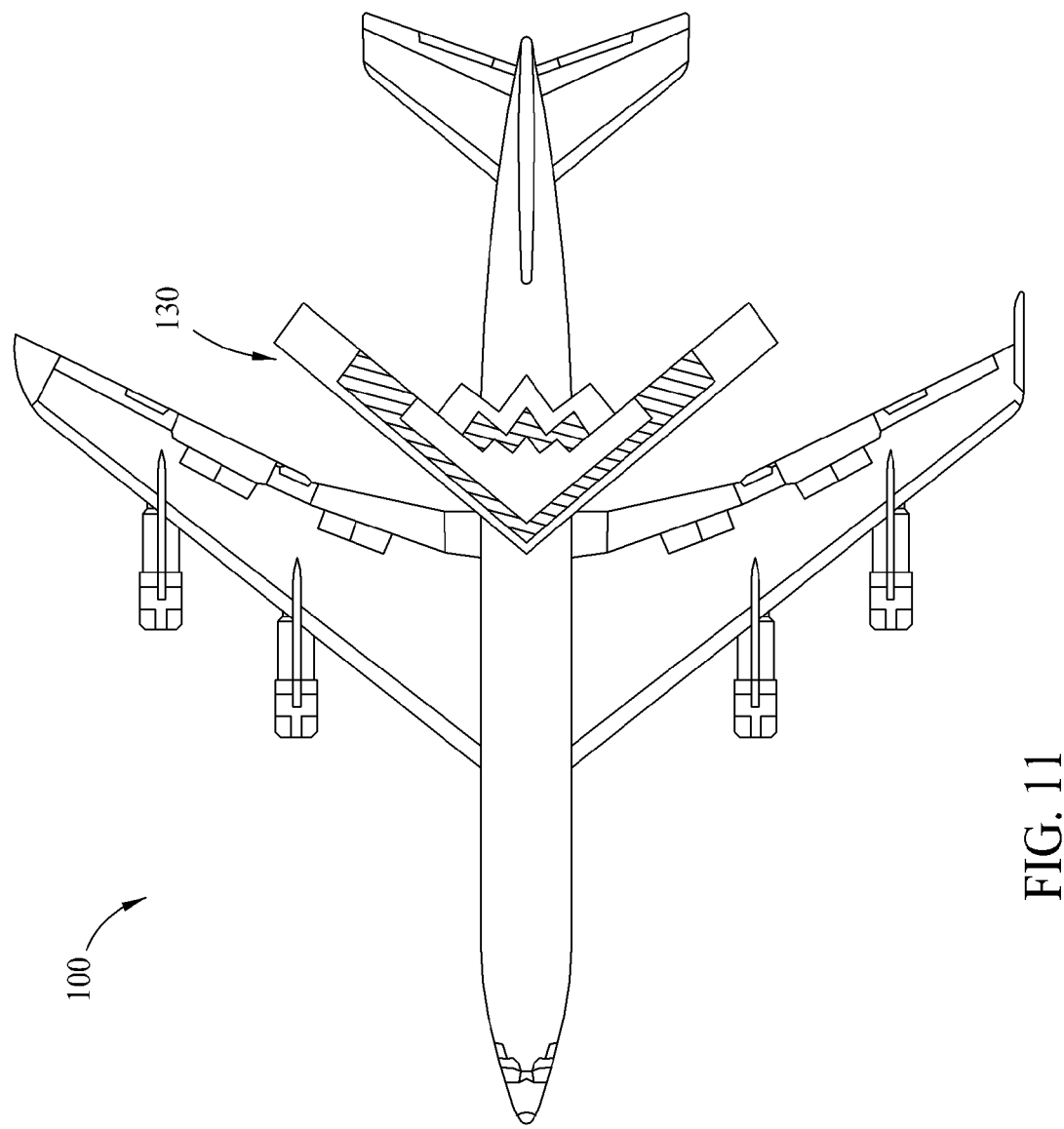
FIG. 11 is a schematic top view of the modified aircraft shown in FIGS. 7 and 8, illustrated with multiple, overlaid test elements of varying scale of a flying wing configuration mounted to the test station.

FIG. 9 schematically illustrates a first set of proposed demonstrator wingset planforms 120 of varying scale mounted to the testing station 110 in top plan view. More specifically, three wingset planforms 120 are shown in FIG. 9 in smaller, intermediate and large sizes with the intermediate wingset platform 120 cross-hatched for visibility. FIG. 10 illustrates one of the wingset planforms 120 mounted to the aircraft 100 in perspective view. FIG. 11 schematically illustrates another set of proposed demonstrator wingset planforms 130 of varying scale mounted to the test station 110. The wingset planforms 130 are shown in smaller, intermediate and large sizes with the intermediate wingset platform 130 cross-hatched for visibility. As is evident from these Figures, the candidate configurations of the wingset planforms 120 and 130 are very different. The wingset platform 130 (FIG. 11) may be recognized for its similarities to a flying wing configuration that has been utilized on a B-2 bomber, for example, while the wingset platform 120 (FIGS. 9 and 10) is a new concept sometimes referred to as a joined wing configuration. Still other wingset planforms may be considered, in addition to or in lieu of the wingset planforms 120 and 130 presently contemplated. Such wingset planforms 120 and 130, among other potential platform configurations of varying size and shape, may each be tested in flight upon the host aircraft 100, without having to design a new aircraft for testing purposes.

As should be evident from FIGS. 9-11, the aircraft 100 is sufficiently large, both in terms of size and weight, in comparison to the wingset planforms 120 and 130 to be tested that the performance of the aircraft 100 in flight is not significantly altered by the wingset planforms 120 or 130. That is, the larger aircraft 100 may carry the proposed wingset planforms 120 or 130 to representative altitudes of interest, without compromising the performance of the aircraft 100 itself. As a practical matter, a minimum wingspan of the wingset planforms 120 or 130 needed to obtain meaningful sensor results for the radar systems is believed to be 30-35 ft, although smaller sizes could alternatively be used, and also larger sizes which are perhaps more desirable for testing purposes.

Figure 12:
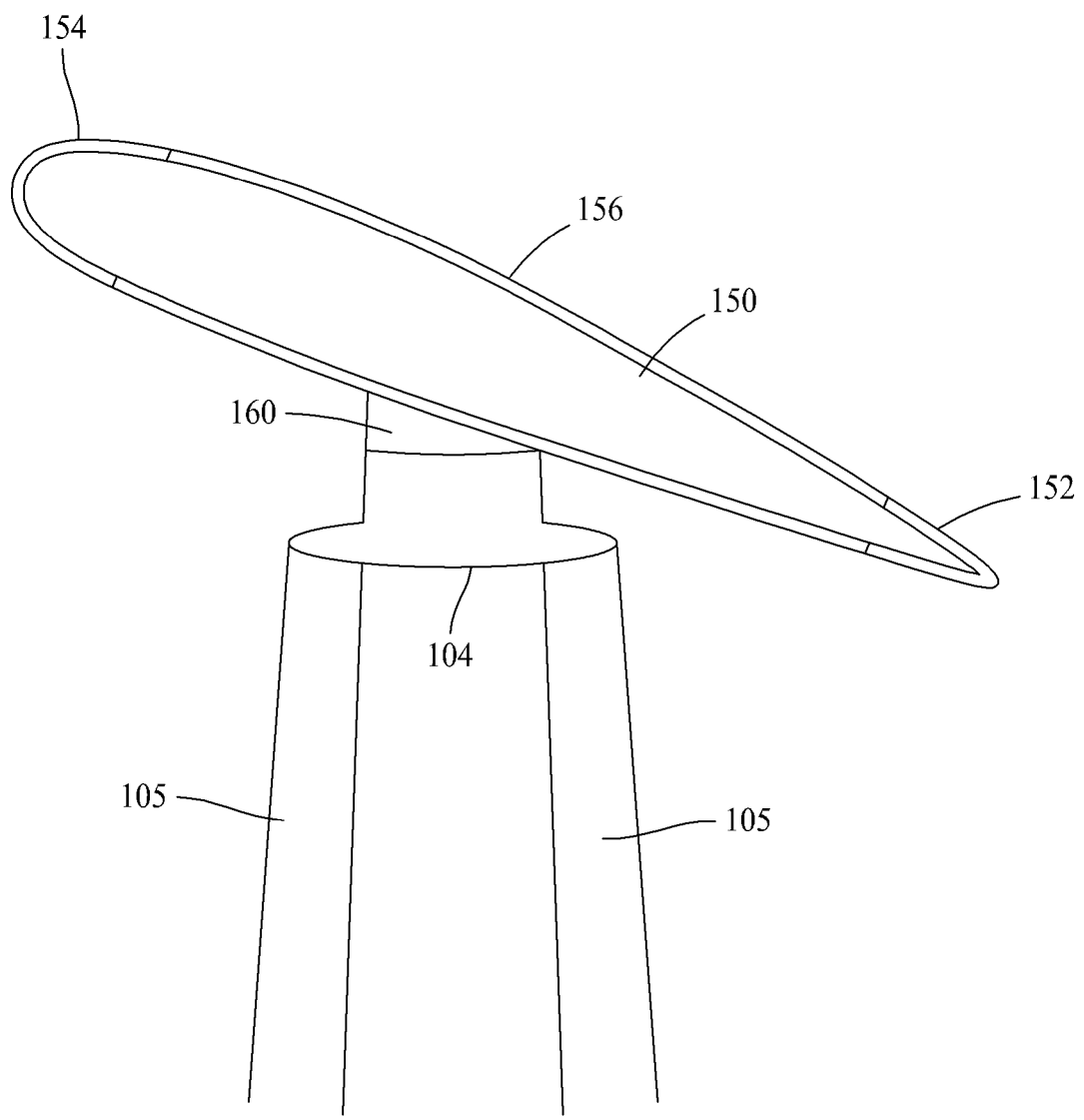
FIG. 12 schematically illustrates a first test mount structure for the modified aircraft.

FIGS. 12-15 schematically illustrate different exemplary mounting configurations to attach a demonstrator wingset platform 150, which may be provided in the configuration of the planforms 120 or 130 shown in FIGS. 9-11, to the masts 105 and the interface 104. The demonstrator wingset platform 150 may include, as shown in FIG. 12, a conformal radar array generally designated at 152 and 154, integrated into a structural skin 156 at, for example, the leading and trailing edges of the wingset platform, as well as other locations in various embodiments. The mounting configurations shown in FIGS. 12-15 each include a mechanism for varying an angle of incidence of the wingset platform 150 relative to a portion of the aircraft that could be set before the aircraft 100 is flown and held constant, or actively changed either on the ground or in flight in various embodiments. Varying the angle of incidence may be used, for example, to reduce loads on the support masts 105 or to simulate flight of the wingset platform at different conditions. As used herein, the angle of incidence shall refer to a degree of inclination between a fixed reference line in the wingset platform (e.g., a lateral axis of the wingset) and another fixed reference line external to the wingset platform (e.g., a longitudinal axis of the fuselage or the top surfaces of the supporting masts), and such reference lines may be real or imaginary in various embodiments. The angle of incidence may likewise refer to an angle of inclination between a first reference plane associated with the wingset platform and a second reference plane associated with the aircraft, whether or not the reference planes are real or imaginary.

In the embodiment shown in FIG. 12, the interface 104 is provided with a riser or wedge 160 that places the wingset platform at a desired angle of incidence relative to the support masts 105. Different wedges 160 could be provided to position the wingset platform at different angles if desired. Such an embodiment using a wedge 160 is contemplated to be manually adjusted while the aircraft 100 is on the ground, and the angle of incidence would remain constant in flight.

Figure 13:
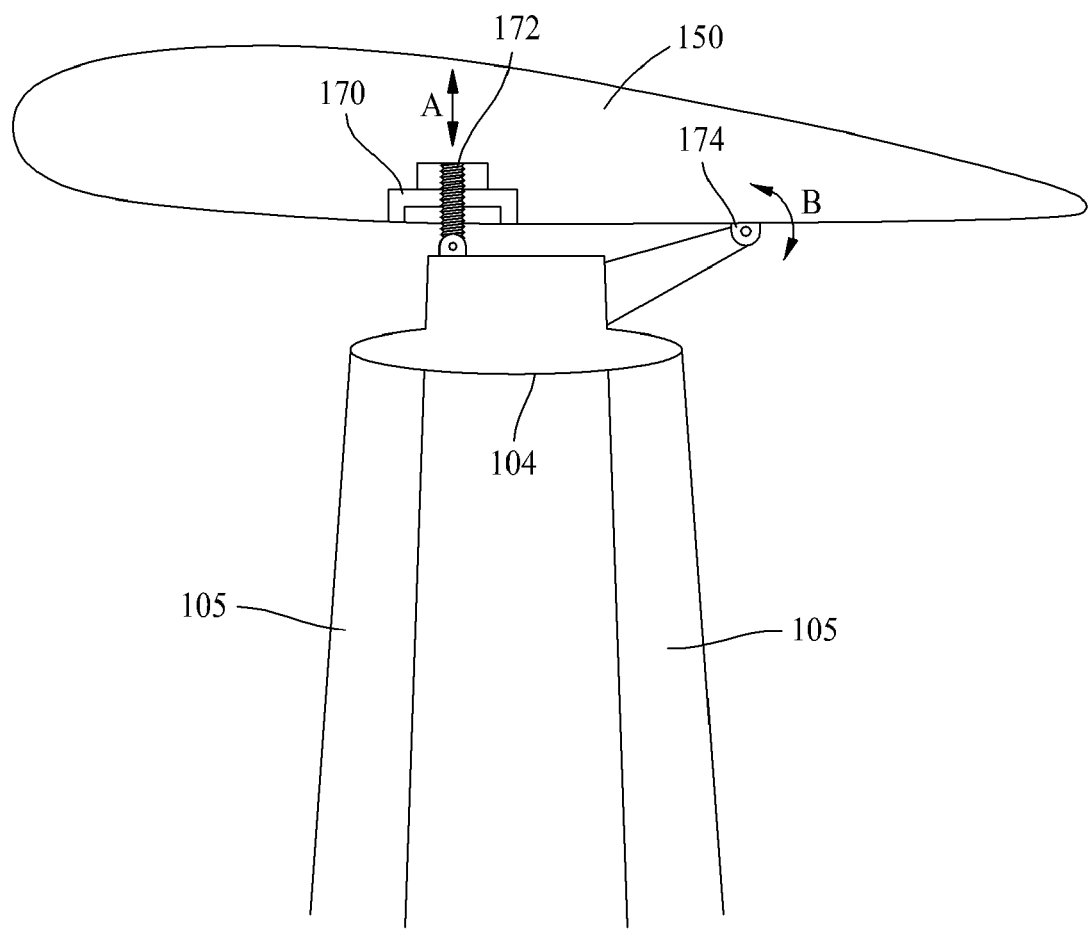
FIG. 13 schematically illustrates a second test mount structure for the modified aircraft.
Figure 14:
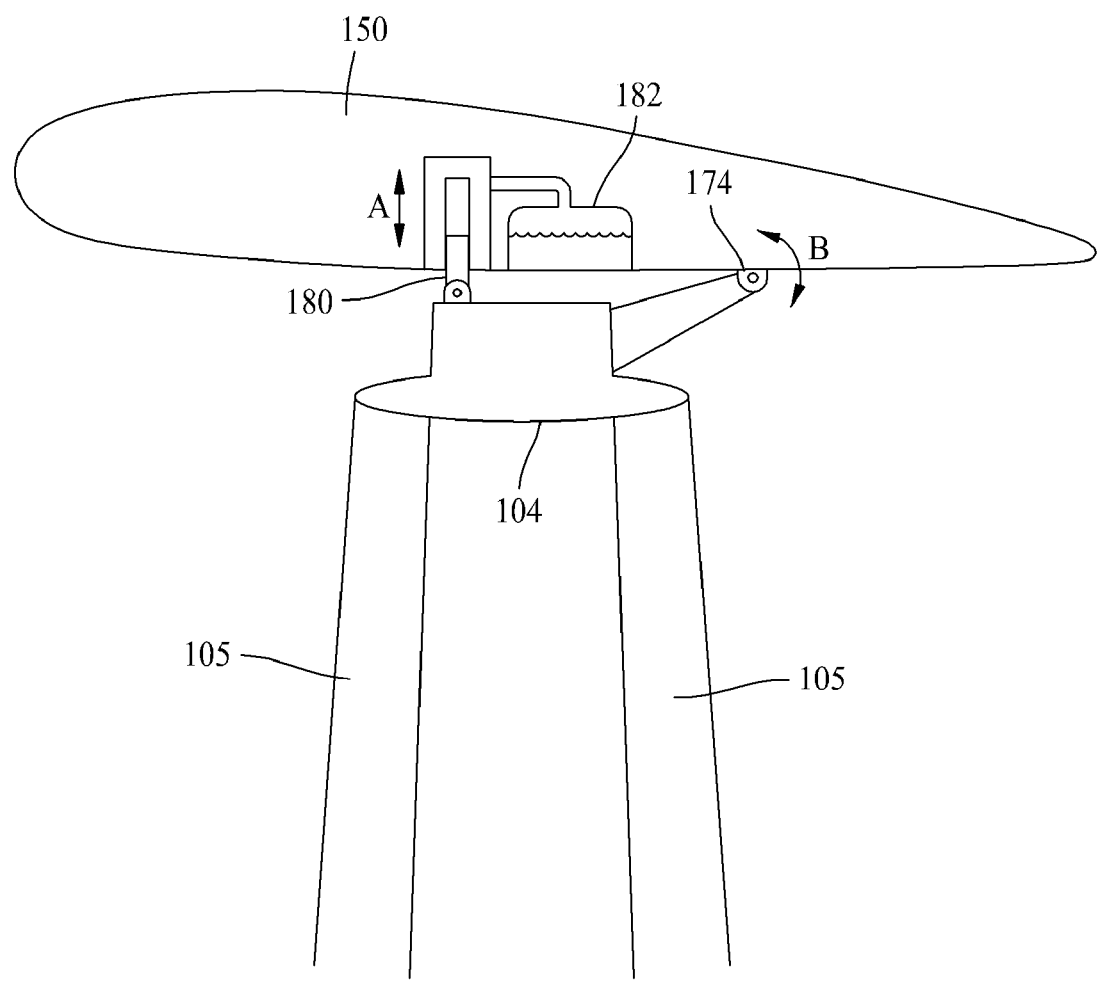
FIG. 14 schematically illustrates a third test mount structure for the modified aircraft.
Figure 15:
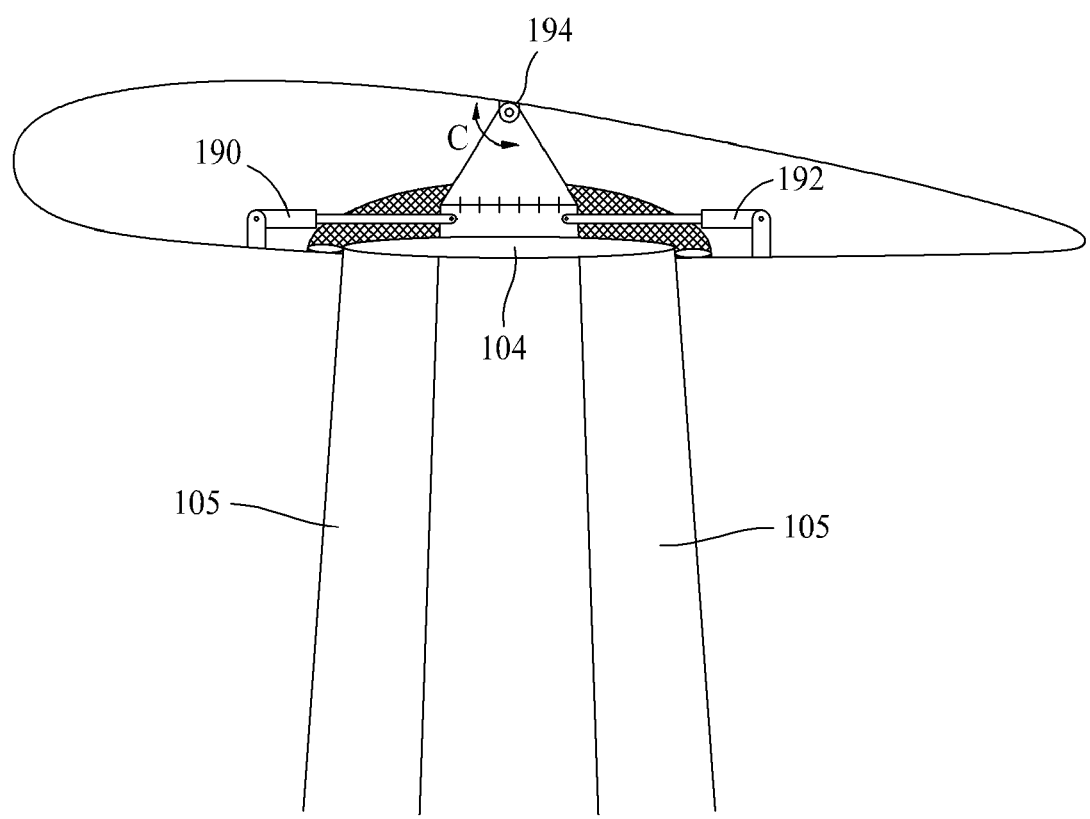
FIG. 15 schematically illustrates a fourth test mount structure for the modified aircraft.

FIGS. 13-15 illustrate automated mount configurations in which the angle of incidence of the wingset platform 150 may be changed on the ground or even in flight if desired.

In the embodiment illustrated in FIG. 13, a motor 170 is provided in combination with a jackscrew 172 to raise or lower the platform 150 with respect to the interface 104 in the direction of arrow A, while pivoting in the direction of arrow B about a hinge 174 at a location spaced from the jackscrew 172. Various types of motors (e.g., hydraulic, electric, pneumatic) could be used with various types of rotary actuators, including but not limited to jackscrews, to increase or decrease the angle of incidence of the platform 150 relative to the masts 105.

FIG. 14 illustrates a mounting configuration including a linear actuator 180, such as a hydraulic ram responsive to pressurized fluid from a reservoir 182, to lift or lower the platform 150 relative to the interface in the direction of arrow A, while pivoting in the direction of arrow B about a hinge 174 at a location spaced from the linear actuator 180. Various types of linear actuators (e.g., electric and pneumatic) may likewise be used in different embodiments in lieu of the hydraulic ram as described. Additionally, more than one linear actuator may be used if desired to facilitate varying the angle of incidence of the platform 150 relative to the masts 105.

FIG. 15 illustrates another mounting configuration including actuators 190 and 192 positioned opposite to one another and causing the platform to swing about a hinge or pivot point 194 in the direction of arrow C to increase or decrease the angle of incidence relative to the masts 105. In such an embodiment using multiple actuators 190 and 192, one actuator could be utilized to push and the other may be utilized to pull to cause the platform 150 to swing in the direction of arrow C. It is contemplated, however, that one of the actuators 190 and 192 could be considered optional in another embodiment, and a single actuator could push or pull the platform 150 to change its angle of incidence relative to the posts.

While various mounting configurations have now been described, it is recognized that still other mounting configurations are possible in addition to or in lieu of the embodiments shown in FIGS. 12-15. Additionally, in any of the embodiments shown, aerodynamic and inertial load data could be taken through the interface 104 and load data could be taken from the demonstrator platform 150 using sensors such as strain gages.

In still further embodiments, mount configurations for the wingset planforms may be provided that allow for adjustability of the angle of the incidence but also roll or yaw angles to simulate flight maneuvers such as banked turns and the like to evaluate how such maneuvers may affect radar performance and field of view. That is, the roll or raw angles of the wingset planforms may be selected to be different from the roll or yaw angles, measured between fixed reference lines or points in the wingset planforms and corresponding reference lines associated with other portions of the aircraft, for testing purposes. Devices that would accommodate three axis movement of the wingset planforms in such a manner are known and include, without limitation, a swash plate mechanism. The angles of incidence, roll, and yaw relative to the aircraft may be independently adjustable or simultaneously adjustable in various embodiments, and the angles may be adjusted in flight or on the ground as desired.

Figure 16:
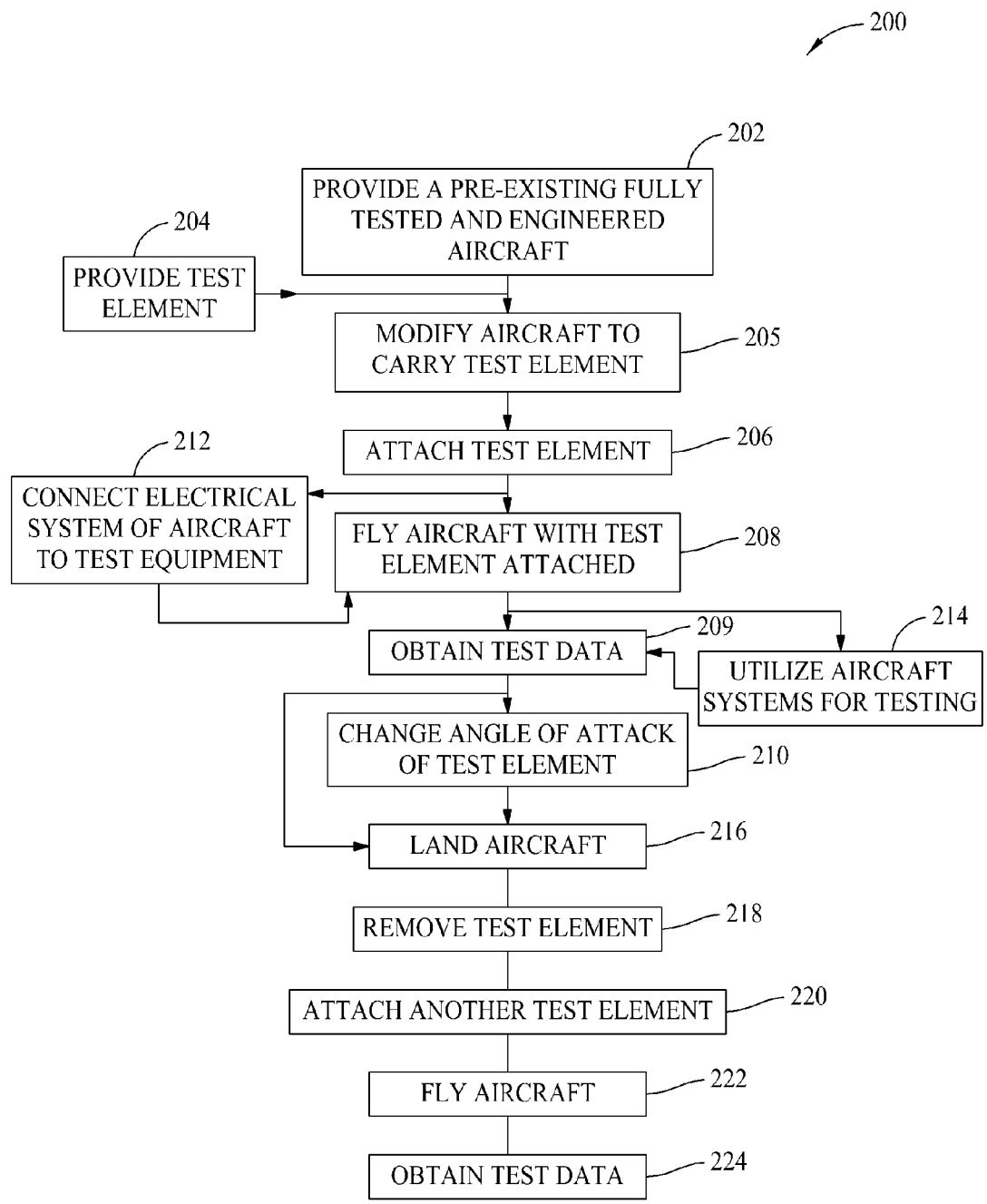
FIG. 16 is a flowchart of an exemplary method of testing an aerodynamic structure.

Having now described the aircraft 100 and demonstrator wingset platform 150 and mounting thereof in some detail, a method 200 of testing an aerodynamic structure will now be described in relation to FIG. 16. The method includes providing 202 a pre-existing, fully engineered and tested aircraft (e.g., the aircraft 100) having a test station (e.g., the test station 110) including an attachment interface (e.g., the interface 104) integrated into the fuselage of the aircraft. As mentioned above, the aircraft provided may be a pre-existing, fully engineered and tested aircraft such as the Boeing E-3 Sentry Airborne Early Warning And Control (AWACS) aircraft. The method may optionally include modifying 105 the aircraft to carry the first aerodynamic test element.

The method 200 further includes providing 204 a first aerodynamic test element (e.g., the demonstrator wingset platform 150), attaching 206 the first aerodynamic test element to the attachment interface; flying 208 the pre-existing, fully engineered aircraft with the first aerodynamic test element attached; and obtaining 209 in-flight testing data for the first aerodynamic test element.

Attaching 206 the first aerodynamic test element may include attaching a proposed wingset platform (e.g., the platform 120) to the attachment interface, or another aerodynamic component or structure of interest for testing purposes. As described above, the wingset platform may include a conformal radar array integrated in a structural skin on the outer surface thereof, and obtaining 209 in-flight testing data may include collecting data regarding the performance of the conformal radar array. Additionally other data, such as strain and pressure data may be collected to evaluate the performance of the wingset platform apart from the radar.

Optionally, the method 200 may further include changing 210 an angle of incidence of the test element relative to the fuselage of the pre-existing, fully engineered aircraft using, for example, the mount configurations depicted in FIGS. 12-15 or other mounting configurations. Changing 210 the angle of incidence may include changing the angle of incidence while the pre-existing fully, engineered aircraft is in flight or when the aircraft is on the ground in various embodiments.

Advantageously, the method 200 may additionally include connecting 212 the electrical power system of the pre-existing, fully engineered and tested aircraft to the first aerodynamic test element and utilizing 214 the fully engineered systems of the pre-existing aircraft to obtain the in-flight testing data. As such, the method 200 is applicable when an aircraft structure devoid of a propulsion system and an electrical power system is provided in step 204.

Once sufficient test data is obtained 208, the method may include landing 216 the pre-existing, fully engineered aircraft, removing 218 the first aerodynamic test element from the attachment interface, and attaching 220 a second aerodynamic test element (e.g., the platform 130) to the attachment interface. The second aerodynamic test element may be, as discussed above, differently configured from the first test element (e.g., the platform 120). Once the second test element is attached 220, the method includes flying 222 the pre-existing, fully engineered aircraft with the second aerodynamic test element attached, and obtaining 224 in-flight testing data for the second aerodynamic test element.

If desired, still another wingset platform, different from the first two could be mounted on the attachment interface for collection of additional test data. Various alternative designs of wingset planforms could more or less be simultaneously considered.

Figure 17:
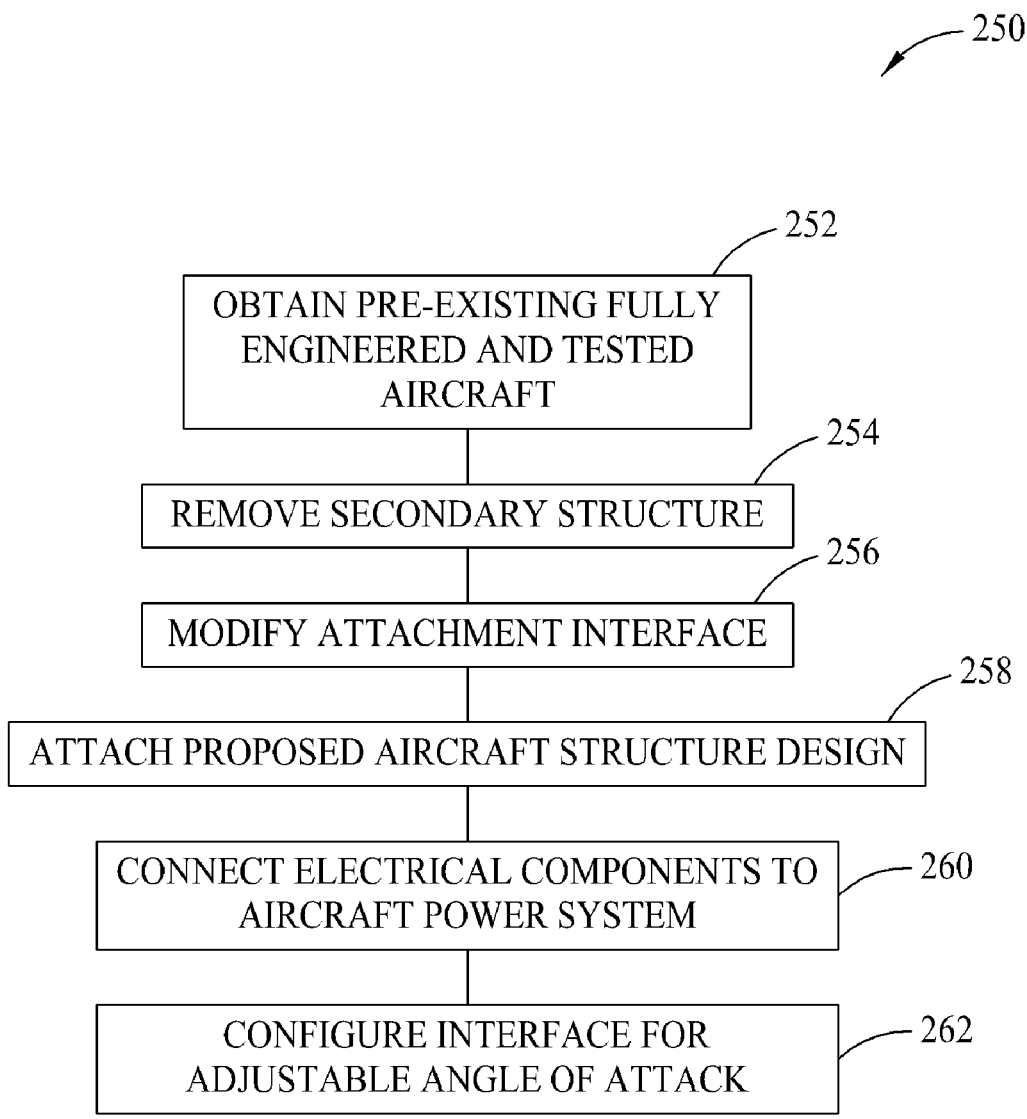
FIG. 17 is a flowchart of an exemplary method of reconfiguring a fully engineered and tested aircraft to conduct testing of a proposed aircraft structure design.

In another aspect, and as shown in FIG. 17, a method 250 of reconfiguring a fully engineered and tested aircraft (e.g., the aircraft 100) to conduct testing of a proposed aircraft structure design will also be explained. The method 250 includes obtaining 252 a fully engineered and tested aircraft having a fuselage (e.g., the fuselage 102), an adaptable interface (e.g., the interface 104) integrated with the fuselage, and with a secondary structure (e.g., the secondary structure 106) attached to adaptable interface. The method also includes removing 254 the secondary structure from the adaptable interface, and modifying 256 the adaptable interface to receive the proposed aircraft structure design for testing purposes. As noted above, the fully engineered and tested aircraft may be a Boeing E-3 Sentry Airborne Early Warning And Control (AWACS) aircraft, or another aircraft.

The method may further include attaching 258 the proposed aircraft structure design to the adaptable interface. The fully engineered and tested aircraft may include an electrical power system and the proposed aircraft structure design may include electrical components, with the method further including connecting 260 the electrical components to the electrical power system. Additionally, other desirable connections, such as hydraulic connections and the like for mechanical purposes, may also be accomplished.

Optionally, the method may include configuring 262 the interface so that an angle of incidence of the proposed aircraft structure design relative to the fuselage is adjustable. This may be accomplished, for example, using the mounting configurations shown in FIGS. 12-15, or other configurations if desired. The proposed aircraft structure design may be a wingset platform including a conformal radar sensor array, or another aerodynamic structure or component as desired.

Many variations of the basic methodology of the methods 200 and 250 are believed to be within the purview of those in the art, it is believed that the methods could be implemented and practiced without further explanation.

This written description uses examples to disclose the inventive concepts, including the best mode, and also to enable any person skilled in the art to practice the same, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of testing an aerodynamic structure comprising:
providing a pre-existing, fully engineered and tested aircraft having a test station including an attachment interface integrated into the fuselage of the aircraft;
providing a first test element comprising a proposed wingset planform;
attaching the first test element to the attachment interface;
flying the pre-existing, fully engineered aircraft with the first test element attached; and
obtaining in-flight testing data for the first test element.

2. The method of claim 1, wherein the first test element comprises a wingset planform having a conformal radar array integrated into an outer surface of a structural skin, and obtaining in-flight testing data comprises collecting data regarding the performance of the conformal radar array.

3. The method of claim 1, wherein fully engineered systems of the pre-existing aircraft are utilized to obtain the in-flight testing data.

4. The method of claim 1, further comprising:
landing the pre-existing, fully engineered aircraft;
removing the first test element from the attachment interface;
attaching a second test element to the attachment interface, the second test element being different from the first;
flying the pre-existing, fully engineered aircraft with the second test element attached; and
obtaining in-flight testing data for the second test element.

5. The method of claim 1, further comprising connecting the electrical power system of the pre-existing, fully engineered aircraft to the first test element.

6. The method of claim 1, further comprising changing at least one of an angle of incidence, roll angle or yaw angle of the test element relative to a corresponding reference line associated with the pre-existing, fully engineered aircraft.

7. The method of claim 6, wherein changing the angle of incidence comprises changing the angle of incidence while the pre-existing fully, engineered aircraft is in flight.

8. The method of claim 1, wherein providing a pre-existing, fully engineered and tested aircraft comprises providing a Boeing E-3 Sentry Airborne Early Warning And Control (AWACS) aircraft.

9. The method of claim 8, further comprising modifying the AWACS aircraft to carry the first test element.

10. A method of reconfiguring a fully engineered and tested aircraft to conduct testing of a proposed airframe design, the method comprising:
obtaining a fully engineered and tested aircraft having a fuselage and wings attached, an adaptable interface integrated with the fuselage and extending upwards from a substantial centerline of the fuselage, and with a secondary structure attached to adaptable interface at an end of the adaptable interface opposite the fuselage;
removing the secondary structure from the adaptable interface; and
modifying the adaptable interface to receive the proposed airframe design for flight testing purposes.

11. The method of claim 10, wherein obtaining the fully engineered and tested aircraft comprises obtaining a Boeing E-3 Sentry Airborne Early Warning And Control (AWACS) aircraft.

12. The method of claim 10, further comprising attaching the proposed aircraft structure design to the adaptable interface.

13. The method of claim 10, wherein the fully engineered and tested aircraft includes an electrical power system and the proposed aircraft structure design includes electrical components, the method further comprising connecting the electrical components to the electrical power system.

14. The method of claim 10, wherein modifying the adaptable interface comprises configuring the interface so that at least one of an angle of incidence, a roll angle or a yaw angle of the proposed aircraft structure design relative to a reference line associated with the aircraft is adjustable.

15. The method of claim 10, wherein the proposed aircraft structure design is a wingset planform including a conformal radar sensor array.

16. An aircraft design testing kit, comprising:
a fully engineered and tested aircraft having a fuselage, wings, and a test station interface extending upwards from a substantial centerline of the fuselage; and
a plurality of interchangeable wingset planforms each mountable to the test station interface, wherein each of the plurality of wingset planforms is capable of being flight tested while mounted to the test station interface.

17. The aircraft design testing kit of claim 16, wherein the plurality of wingset planforms are provided with conformal radar sensor arrays.

18. The aircraft design testing kit of claim 16 wherein the fully engineered and tested aircraft is a modified Boeing E-3 Sentry Airborne Early Warning And Control (AWACS) aircraft.

* * * * *